United States Patent [19]
Golyshin et al.

[11] 3,920,680
[45] Nov. 18, 1975

[54] METHOD FOR PREPARING SUBSTITUTED BENZIMIDOZOLES AND THEIR USES 1-(PHENOXYACETYL)CARBAMINOYL-2-CARBOMETHOXYAMINOBENZIMIDAZOLE

[76] Inventors: Nikolai Mikhailovich Golyshin, Malaya Kaltinikovskaya ulitsa, 20, korpus 1, kv. 60; Elena Ivanovna Andreeva, Malaya Kaltinikovskaya ulitsa, 20, korpus 1, kv. 12; Elza Alexandrovna Dvoichenkova, Astakhovsky pereulok, 1/2, kv. 63; Nina Sergeevna Ukrainets, Krasnoprudnaya ulitsa, 14, kv. 9; Tatyana Pavlovna Skazkina, Malaya Kalitnikovskaya ulitsa, 20, korpus 1, kv. 79; Galina Viktorovna Solovieva, Semenovskaya naberezhnaya, 3/1, korpus 6, kv. 242; Margarita Romanovna Bodrova, Kutuzovsky prospekt, 27/1, kv. 90, all of Moscow; Nina Alexandrovna Rotastikova, Granitny poselok, Zavodskaya, Dolgoprudny Moskovskoi oblasti; Nikolai Nikolaevich Melnikov, ulitsa Dmitria Ulyanova, 4, korpus A, kv. 96, Moscow; Stepan Sofronovich Kukalenko, Vorontsovskaya ulitsa, 32/36, kv. 30, Moscow; Karen Armenakovich Nuridzhanian, Zeleny prospekt, 35, korpus 2, kv. 19, Moscow; Lilia Mikhailovna Nesterova, Rizhskaya ulitsa, 6, kv. 14, Narofominsk Moskovskoi oblasti; Marat Tashpulatovich Usmanov, ulitsa Gromova, 97, Tashkent; Raisa Grigorievna Novikova, Likhachevsky prospekt, 9, kv. 6, Dolgoprudny Moskovskoi oblasti; Galina Vladimirovna Kuznetsova, Shelepikhinskoe shosse, 5, kv. 64, Moscow; Stepan Dmitrievich Volodkovich, Malaya Kalitnikovskaya ulitsa, 20, korpus 1, kv. 42, Moscow; Nikolai Mikhailovich Burmakin, Malaya Kalitnikovskaya ulitsa, 20, korpus 1, kv. 57, Moscow; Valentina Ivanovna Obukhova, Sovetskaya ulitsa, 8, kv. 54, Dolgoprudny Moskovskoi oblasti; Violetta Ivanovna Monova, ulitsa Vavilova, 89, kv. 102, Moscow; Galina Nikonovna Shkuratova, Novo-Cheremushkinskaya ulitsa, 41, korpus 1, kv. 74, Moscow; Mikhail Arsenievich Sanin, Malaya Kalitnikovskaya 20, korpus 1, kv. 58, Moscow; Natalya Nikolaevna Kulagina, 5 Kozhukhovskaya ulitsa, 22, korpus 1, kv. 61, Moscow; Nina Evgenievna Mironova, Maly Kakovinsky Pereulok, 1/8, kv. 17, Moscow, all of U.S.S.R.

[22] Filed: Dec. 21, 1973

[21] Appl. No.: 427,132

Related U.S. Application Data

[63] Continuation of Ser. No. 233,716, March 10, 1972, abandoned.

[52] U.S. Cl............................. 260/309.2; 424/273
[51] Int. Cl.$^2$...................................... C07D 235/32
[58] Field of Search............................... 260/309.2

[56] References Cited
UNITED STATES PATENTS

| | | | |
|---|---|---|---|
| 3,010,968 | 11/1961 | Loux | 260/309.2 |
| 3,541,213 | 11/1970 | Klopping | 260/309.2 |
| 3,647,817 | 3/1972 | Dittmar | 260/309.2 |
| 3,692,783 | 9/1972 | Baker | 260/309.2 |

OTHER PUBLICATIONS
Craig et al., Chem. Abst. 69:96721j (1968).
Hofman, "Imidazole and its Derivatives, Part I," Interscience, New York, N.Y. (1953), pp. 251, 379, 384 and 385.

*Primary Examiner*—G. Thomas Todd
*Attorney, Agent, or Firm*—Holman & Stern

[57] ABSTRACT
New compounds are actually substituted benzimidazoles having the general formula

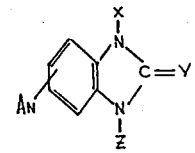

where X is either absent or is H, acyl, substituted and nonsubstituted aryloxy(thio-, amino-)acyl, carbalkoxyl, aryloxy(thio-, amino-)acylcarbaminoyl, carbaminoyl, substituted or nonsubstituted arylpyrrolidonesulpho; Y is H, carbalkoxyamino, hydroxyalkyl, acyloxyalkyl, acylcarbaminoyloxyalkyl, substituted and nonsubstituted aryloxy(thio-, amino-)acylcarbaminoylamino, aryloxyacylcarbaminoalkyl; Z is H, acyl, substituted and nonsubstituted arloxy(thio, amino-)acyl, carbalkoxyl, aryloxy(thio-, amino-) acylcarbaminoyl, carbaminoyl, substituted on nonsubstituted arylpyrrolidone-sulpho; A is H, halogen, nitro group, alkyl, substituted alkyl, alkoxy; and n is from 1 to 4.
These new compounds are used in the capacity of fungicides to protect plants and nonmetallic materials.
Substituted benzimidazoles having the general formula

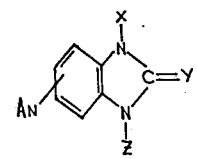

where X and Z are H, acyl aryloxyacyl substituted for a halide or a nitro group aryloxyacylcarbaminoyl substituted for a halide or a nitro group; Y is H, carbalkoxyamino, acyloxyalkyl, hydroxyalkyl, acylcarbaminoyloxyalkyl, substituted and nonsubstituted aryloxy(thio-, amino-)acylcarbaminoylamino, aryloxyacylcarbaminoylaminoalkyl; A is H, halogen, nitro group, alkyl, substituted alkyl, alkoxy; and n is from 1 to 4, are used in the capacity of herbicides.

1 Claim, No Drawings

3,920,680

METHOD FOR PREPARING SUBSTITUTED BENZIMIDOZOLES AND THEIR USES 1-(PHENOXYACETYL)CARBAMINOYL-2-CARBOMETHOXYAMINOBENZIMIDAZOLE

This is a continuation of application Ser. No. 233,716, filed Mar. 10, 1972, now abandoned.

This invention relates to the method for preparing new compounds, which are substituted benzimidazoles, and their use. The said new compounds have the general formula

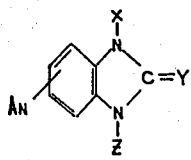

where X is either absent or is H, acyl, substituted and nonsubstituted aryloxy(thio-, amino-)acyl, carbaloxyl, aryloxy(thio-, amino-)acylcarbaminoyl, carbaminoyl, substituted or nonsubstituted arylpyrrolidone-sulpho; Y is H, carbalkoxyamino, hydroxyalkyl, acyloxyalkyl, acylcarbaminoyloxyalkyl, substituted and nonsubstituted aryloxy(thio-, amino-)acylcarbaminoylamino- aryloxyacyl carbaminoylaminoalkyl; Z is H, acyl, substituted and non-substituted aryloxy(thio-, amino-)acyl, carbalkoxyl, aryloxy(thio-, amino-) acylcarbaminoyl, substituted or nonsubstituted arylpyrrolidone-sulpho; A is H, halogen, nitro group, alkyl, substituted alkyl, alkoxy; and n is from 1 to 4.

These new compounds are biologically active substances that can be used as fungicides to control plant diseases, as a seed dressing agent, as anticeptic for nonmetallic materials and as weed killers.

The new compounds can also be used as nematocides and molluscocides, and also as medicinal preparations.

A method is known in the prior art for preparing substituted benzimidazoles, consisting in that derivatives of benzimidazoles are reacted with acylating agents, for example with alkylarylisocyanates, arylisocyanates, halide hydrates of aliphatic and aromatic acids, etc, in a medium of organic solvents (chloroform, carbon tetrachloride, etc) at a temperature to 100°C with subsequent isolation of the main product (U.S. Pat. No. 3,541,213).

This method cannot however be used to prepare compounds that would possess simultaneously high fungicidal properties and selective herbicidal activity.

The object of this invention is to remove these disadvantages.

This object has been attained by using a new starting material and by altering the process so that compounds possessing high fungicidal and activity could be obtained.

In the proposed method for preparing the substituted benzimidazoles by the interaction between benzimidazoles and acylating agents in a medium of an inert organic solvent at a temperature to 100°C with subsequent isolation of the final product according to the invention, the substituted and nonsubstituted benzimidazoles of the general formula

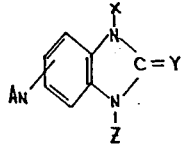

where X is either absent or is H, acyl, substituted and nonsubstituted aryloxy(thio-, amino-,)acylcarbaminoyl, carbaminoyl, substituted on nonsubstituted arylpyrrolidonesulpho; Y is H, carbalkoxyamino, hydroxyalkyl, acyloxyalkyl, acylcarbaminoyloxyalkyl, substituted and nonsubstituted aryloxy(thio-, amino-)acycarbaminoylamino, aryloxyacylcarbaminoylaminoalkyl; Z is H, acyl, substituted and nonsubstituted aryloxy(thio-, amino-)acyl, carbalkoxy;, aryloxy(thio-, amino-)acylcabaminoyl, carbaminoyl, substituted or nonsubstituted arylpyrrolidone-sulpho; A is H, halogen, nitro group, alkyl, substituted alkyl, alkoxy; and n is from 1 to 4, are reacted with acylating agents which is substituted and nonsubstituted aryloxy(thio-, amino-)acylisocyanates or substituted and nonsubstituted aryloxy(thio-, amino-)acylhalides, pyrrolidonaryl sulphonyl chloride or acetyl chloride.

The proposed method is effected as follows. The substituted benzimidazoles of the general formula

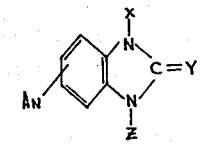

where X is either absent, or is H, acyl, substituted and nonsubstituted aryloxy(thio-, amino-)acyl, carbalkoxyl, aryloxy(thio-, amino-)acylcarbaminoyl, carbaminoyl, substituted or nonsubstituted arylpyrrolidonesulpho; Y = H, carbalkoxyamino, hydroxyalkyl, acyloxylkyl, acylcarbaminoyloxyalkyl, substituted and nonsubstituted aryloxy(thio-,amino-)acylcarbaminoylamino, aryloxyacylcarbaminoylaminoalkyl; Z is H, acyl, substituted and nonsubstituted aryloxy(thio-, amino-)acyl, carbalkoxyl, aryloxy(thio-, amino-)acylcarbaminoyl, carbaminoyl, substituted or nonsubstituted arylpyrrolidone-sulpho; A is H, halogen, nitro group, alkyl, substituted alkyl, alkoxy; and n is from 1 to 4, are reacted with acylating agents, which are substituted and nonsubstituted aryloxy (thio-,amino-)acylhalides, or pyrrolidone arylsulphonyl chloride or acetyl chloride. The process is carried out at a temperature to 100°C, preferably at 20° to 40°C, in a medium of an inert organic solvent, for example, benzene or chloroform. Whenever necessary, the process is carried out in the presence of hydrogen-chloride acceptor. The yield of the final product is 70 to 90 percent of theory.

The compounds obtained by the described process are white or yellowish crystalline substances, sparingly soluble in organic solvents, soluble in tetrahydrofurane, partly soluble in acetone and pyridine; decomposed at temperatures from 150° to 350°C.

The proposed method can be used to prepare substituted benzimidazoles of high quality, having high fungicidal and herbicidal activity.

According to the invention, the said compounds are used as fungicides to control plant diseases and to protect nonmetallic materials.

1-Phenoxyacetylcarbaminoyl-2-carbo-methoxyamine benzimidazole, having the general formula

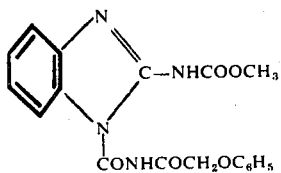

is the most active compound, having high fungicidal potency in protection of plants and nonmetallic materials.

Fungal diseases in plants are now controlled by the derivatives of dithiocarbamic acid, viz., Zineb, Maneb, Ferbam, Polyram, and others. These fungicides, as well as inorganic copper-containing preparations (Bordeaux mixture, copper oxychloride and others), possess high efficacy against some plant diseases, like black spot, blue mould, powdery mildew, late blight, etc.

One of the disadvantages inherent in the known fungicides on the basis of derivatives of dithiocarbamic acid and copper-containing compounds, is their weak efficacy or complete impotence against mildew fungi and vascular tracheomycous diseases of the wilt type.

At the same time, the preparations used against mildews, for example, Carathane and others, are ineffective against other widely spread plant diseases.

Unlike the known commercial fungicides, the proposed new compounds possess high potency against mildews and at the same time are effective against a wide range of other important pathogens, for example, black spot, scab, cereal rusts, mildews of vine, moulds on stored agricultural products (including seeds) and other diseases.

The proposed preparations are superior to Carathane, and in certain cases to Benlat, with respect to their potency against mildews.

Moreover, the proposed new preparations have quite an interesting and useful property: they can be absorbed by plants, for example, from soil, and can move inside them to ensure fungicidal protection of the whole plant, including the new off-springs.

This property makes the proposed new preparations applicable not only by sprinkling of the vegetation, but also by introducing them into soil.

For example, the introduction of aqueous suspensions containing exceptionally small doses of the preparation (of the order of 5-1.25 mg per kg dry soil) practically completely protects cucumbers from mildews. The fungicidal activity of the new preparations is not inferior, and in certain cases is even superior to that of Benlat.

The high systemic activity of the proposed preparations offers good prospects for their use against tracheomycous diseases, for example, against wilt of cotton, by introducing the preparations into the soil in the form of dusts and solutions, or by sprinkling the developing plants.

The new preparations are not inferior, and in certain cases are even superior to the known preparation Benlat with respect to its potency against this disease.

The results of the laboratory and field experiments show that the use of these preparations for dressing seeds, also offers quite good prospects.

The new preparations completely protect seeds from moulds, and are far superior to hexachlorobenzene with respect to their activity. The activity of the new preparation with respect to potency against stinking smut are somewhat inferior to the mercury preparation Granozane and hexachlorobenzene when used against the intense background of infection, but still they are markedly superior with respect to increasing crops.

The wide spectrum of activity and the high stability of the proposed compounds makes them applicable in the capacity of anticeptics to protect nonmetallic materials.

The tests have shown that these compounds are highly effective against fungi attacking nonmetallic materials. With respect to their activity, the new preparations are far superior to penthachlorophenol and are not inferior to Benlat. Thus, the new preparations can be widely used in the manufacture of textiles, plastics, and in leather tanning, as anticeptics processing higher efficacy as compared with the known preparations.

Moreover, according to the invention the substituted benzimidazoles having the general formula

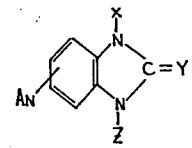

where X and Z are H, acyl, aryloxyacyl substituted for a halide or a nitro group, aryloxyacylcarbaminoyl substituted for a halide or a nitro group; Y is H, carbalkoxyamino, acyloxyalkyl, hydroxyalkyl, acylcarbaminoyloxyalkyl, substituted and nonsubstituted aryloxy(thio-, amino-)acylcarbaminoylamino, aryloxyacylcarbaminoylaminoalkyl; A is H, halogen, nitro group alkyl, substituted alkyl, alkoxy; n is from 1 to 4, can be used as herbicides. 1-(4-chlorophenoxyacetyl)-carbaminoyl-2-carbomethoxyaminobenzimidazole having the general formula

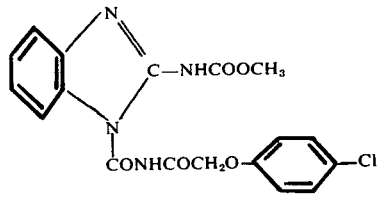

is the most active compound in this group.

The said compounds can also be used as selective killers of dicotyledonous and protective fungicides for monocotyledonous cereals. The herbicidal activity of these compounds against dicotylednonous is not inferior to that of DCA (24-dichloroanisole), and with respect to fungicidal activity, for example against black stem rust, it is not inferior to Zineb.

The preparations can be used in the form of wettable powders, concentrated emulsions and other suitable forms.

For a better understanding of the invention, the following examples of preparing the new compounds and testing their fungicidal and herbicidal activity are given hereinbelow by way of illustration.

EXAMPLE 1

To a suspension of 1.41 g of 2-aminobenzimidazole in 50 ml of anhydrous benzene added at room temperature was a solution of 2.35 g of 4-nitrophenoxyacetylisocyanate in benzene. The components were mixed for two hours, the precipitate was separated on a filter, washed with acetone several times and dried in air. The resultant product was 3.55 g (94 per cent by weight) of 2-(4-nitrophenoxyacetylcarbaminoyl-)aminobenzimidazole. The melting point of the product, 245°C (with decomposition).

Found, in per cent: N - 19.66. 19.50 $C_{16}H_{13}N_5O_5$. Calculated, in percent: N - 19.43. IR spectrum (KBr tablet):
$\nu_{c=o}(1642 \text{ cm}^{-1}), \nu_{c=o}(1700 \text{ cm}^{-1})$

EXAMPLE 2

A suspension of 0.47 g of methyl ether of 2-amino-1-benzimidazole carbamic acid in 20 ml of anhydrous benzene and 0.53 g of 4-nitrophenoxyacetylisocyanate were mixed for two hours at room temperature, the precipitate was separated on a filter, washed with benzene and dried. The resultant product was one gram (99 per cent by weight) of 1-carbomethoxy-2-(4-nitrophenoxyacetyl)-carbaminoylaminobenzimidazole. The melting point of the product, 180°C (with decomposition).

Found, in percent: N 16.46; 16.66.$C_{18}H_{15}N\ O_7$ Calculated, % N 16.61. IR spectrum (KBr tablet): $\nu_{c=o}1649$ cm$^{-1}$; $\nu_{c=o}1704$ cm$^{-1}$; $\nu_{c=o}1745$ cm$^{-1}$.

EXAMPLE 3

A suspension of 2 g of 2-aminopropylibenzimidazole in 20 ml of anhydrous benzene was mixed with a benzene solution of 2.41 g of 4-chlorophenoxyacetylisocyanate at a temperature of 20°C for 2 hours and allowed to stand overnight. Then, 30 ml of isooctane were added, the precipitate was separated on a filter, washed with isooctane, alcohol, and dried. The resultant product was 3.90 g (88 percent by weight) of 2-(4-chlorophenoxyacetylcarbaminoylaminopropyl)-benzimidazole. The melting point, 194°–195°C (with decomposition)

Found, in percent: N - 14.01; 14.17. $C_{19}H_{19}ClN_4O_3$. Calculated, in per cent; N 14.45. IR spectrum (KBI tablet): $\nu_{c=o}1740$ cm$^{-1}$; $\nu_{c=o}1640$ cm$^{-1}$; $\nu_{NH}3349$ cm$^{-1}$.

EXAMPLE 4

A suspension of 200 g of 2-amino-4-chlorobenzimidazole in 40 ml of anhydrous benzene was mixed at room temperature with 1.6 g of phenoxyacetylisocyanate in 40 ml of anhydrous benzene for two hours. The precipitate was then separated on a filter, washed with benzene and air dried to obtain 3.1 g of 1-phenoxyacetylcarbaminoyl-2 -carbomethoxyamino-4-chlorobenzimidazole. The melting point, 180°C (with decomposition. Found, in per cent: N 13.58; 13.70 $C_{18}H_{15}ClN_4O_5$. Calculated, in per cent: N 13.91.

EXAMPLE 5

A suspension of 0.5 g of 2-carboisopropoxyaminobenzimidazole in anhydrous benzene was mixed with 0.4 g of phenoxyacetylisocyanate in 40 ml of anhydrous benzene at room temperature for two hours, the precipitate filtered off, washed with benzene and air dried to obtain 0.8 g of 1-phenoxyacetylcarbaminoyl-2-carboisopropoxyaminobenzimidazole. The melting point of the product, 300°C (with decomposition).

Found, in per cent: N 14 13.85; 13.94; $C_{20}H_{20}N_4O_5$. Calculated, in percent: N 14.14.

EXAMPLE 6

5, 1-Phenoxyacetylcarbaminoyl-2-carbomethoxyaminobenzimidazole was obtained as described in Example 5. The yield was 99 percent by weight. The melting point of the product, 280°–282°C (with decomposition).

Found, in percent: N 15.31; 15.42. $C_{18}H_{16}N_4O_5$. Calculated, in percent: N 15.21.

EXAMPLE 7

1-(4-chlorophenoxyactyl)-carbaminoyl-2-carbomethoxyaminobenzimidazole was prepared as described in Example 5. The yield of the product was 99 per cent (w/w). The melting point, 250°C (with decomposition).

Found, in percent: N 14.04; 14.14. $C_{18}H_{15}ClN_4O_5$. Calculated, in percent: N 13.92

EXAMPLE 8

5 g of 1-(2,4-dichlorophenoxyacetyl) carbaminoyl-2-carbomethoxyaminobenzimidazole were prepared as described in Example 5. The yield of the product was 99 percent by weight; the melting point, 278°C (with decomposition).

Found, in percent N 13.05; 12.98 $C_{18}H_{14}Cl_2N_4O_5$. Calculated, in percent: N 12.86

EXAMPLE 9

5 g of 1-phenoxyacetylcarbaminoyl-2-carboethoxyaminobenzimidazole were prepared as described in Example 5. The yield of the product was 83 per cent by weight; the melting point, 300°C (with decomposition). Found, in per cent: N 14.32; 14.40. $C_{19}H_{18}N_4O_5$. Calculated, in percent: N 14.66

EXAMPLE 10

1 g of 2-carbomethoxyaminobenzimidazole suspension in 15 ml of chloroform was mixed at room temperature with 2.05 g of 2,4-dichlorophenoxyacetylchloride, then 0.8 of triethylamine in 5 ml of chloroform was added gradually to the mixture. After mixing for an hour, the reaction mixture was washed two times with 150 ml portions of ice-cold water, the precipitates was separated on a filter, the chloroform layer dehydrated over sodium sulphate and evaporated to prepare 1.55 g of 1-(2,4-dichlorophenoxyacetyl)-2-carbomethoxyaminobenzimidazole (76 per cent by weight). The product was purified by washing two times with a mixture of n-heptane and tetrahydrofurane (1:1). The melting point of the product, 175°C (with decomposition).

Found, in percent: C 51.40; 51.80; H, 3.17; 2.90; N 11.23; 11.10; Cl - 18.27; 18.58. $C_{17}H_{11}Cl_2N_3O_4$. Calculated, in percent: C 51.90; H 3.55; N 10.68; Cl 18.10.

EXAMPLE 11

1-Phenoxyacetyl-2-carbomethoxyaminobenzimidazole was obtained as described in Example 10. The yield of the product was 65 percent by weight; the melting point, 170°C (with decomposition).

Found, in percent: N - 12.76;, 12.93. $C_{17}H_{15}N_3O_4$. Calculated, in percent: N 12.92.

EXAMPLE 12

1-(4-nitrophenoxy)-acetyl-2-carbomethoxyaminobenzimidazole was obtained as described in Example 10. The yield of the product was 65 percent by weight; the melting point, 192°C (with decomposition).

Found, in percent: N 15.68; 15.50 $C_{17}H_{14}N_4O_6$. Calculated, in percent: N 15.15

EXAMPLE 13

1-(2-methylphenoxyacetyl)-2-carbomethoxyaminobenzimidazole was prepared as described in Example 10. The yield of the product was 73 percent by weight; the melting point, 175°C (with decomposition).

Found, in percent: N 12.88; 12.56; $C_{18}H_{17}N_3O_4$. Calculated, in per cent: N 12.40

EXAMPLE 14

1-(4-chlorophenoxyacetyl)-2-carbomethoxyaminobenzimidazole was prepared as described in Example 10. The yield of the product was 72 percent by weight. The melting point, 200°C (with decomposition). Found, in percent: N 11.95; 12.04 $C_{17}H_{14}ClN_3O_4$. Calculated, in percent: N 11.70

EXAMPLE 15

1-(4-nitrophenoxyacetyl)-2-carbomethoxyamino-4-chlorobenzimidazole was prepared as described in Example 10. The yield of the product was 76 per cent by weight; the melting point, 182°C (with decomposition). Found, in percent: N 14.14; 14.07. $C_{17}H_{13}ClN_4O_6$. Calculated, in percent: N - 13.90

EXAMPLE 16.

To a suspension of 9.6 g of methyl ether of benzimidazole-2-carbamic acid and 8 g of phenylpyrrolidone sulphochloride in 50 ml of carbon tetrachloride added with stirring were 3.93 g of pyridine. The reaction mixture was then cooled to a temperature of 20°C, the precipitates separated on a filter and washed with water, acetone and ether to prepare 8.1 g (39.2 percent by weight) of 1-(4-pyrrolidonephenyl) sulpho-2-carbomethoxyaminobenzimidazole.

Found, in percent: C 54.35; 54.93; H 4.56; 4.41. $C_{19}H_{18}N_4SO_5$. Calculated, in percent: C 55.07; H 4.35.

EXAMPLE 17

To 4 g of actyl chloride added with stirring were 5 g of 3-(benzimidazole-2) propyl alcohol. The reaction temperature was raised to 60°C, the reaction mixture kept at this temperature for ten minutes. The reaction mixture was then cooled to 20°C, the formed crystalline mass was triturated in sulphur ether and passed through a filter to prepare 5.9 g (95.3 per cent by weight) of 2-(3'-acetyloxypropyl)benzimidazole; the melting point of the product, 134°–134.5°C.

Found, in percent: C 56.8; 57.08; H 6.28; 6.08; N 12.28; 12.39. $C_{12}H_{14}N_2O_2$. calculated, in per cent: C 66.05; H 6.42 N. 12.84.

EXAMPLE 18

To 6.9 g of benzoyl chloride added gradually with stirring were 5 g of 3-(benzimidazolyl-2) propionic alcohol. The reaction mixture was heated to 60°C and kept at this temperature for 10 minutes. The reation mixture was then cooled to 20°C and the formed crystalline melt was ground in sulphur ether. The crystals were separated on a filter and washed with the ether to prepare 4.3 g (54 percent by weight) of 2-(3'-benzoyloxypropyl) benzimidazole; the melting point of the product, 157°–157.5°C.

Found, in percent: C 63.30; 63.71; H 5.24; N 10.26; 10.25 $C_{17}H_{16}N_2O_2$. Calculated, in percent: C 72.86; H 5.71; N 10.0.

EXAMPLE 19

To 4.8 g of trichloroacetyl chloride added gradually were 2.76 g of 3-(benzimidazolyl-2-) propyl alcohol. The reaction mixture was heated to 82°C, kept at this temperature for ten minutes, then cooled to a temperature of 20°C, ground with sulphur ether, and the crystals separated on a filter to prepare 5 g of (100 parts by weight) of 2-(3'-trichloroacetyloxypropyl)benzimidazole; the melting point, 147°C (sublimes).

Found in percent: (40.34; 40.65; H 3.61; 3.90; C 36.39; 37.93; N 8.25; 8.23; $C_{12}H_{11}Cl_3N_2O_2$ Calculated, in per cent: C 44.79; H 3.42; C 33.13; N 8.71.

EXAMPLE 20

To a suspension of 2.36 g of benzimidazole in 20 ml of anhydrous benzene added at room temperature were 4.5 g of 2-methyl-4-chlorophenoxyacetylisocyanate in 20 ml of benzene. The components were mixed for 20–30 minutes, ample colourless crystals separated on a filter, washed with benzene, ether and air dried to prepare 5.29 g of 1-(2-methyl-4-chlorophenoxyacetylcarbaminoyl)-benzimidazole (95 percent by weight); the melting point, 100–101°C.

Found, in percent: C 59.30; 58.72; H 3.80; 3.89; Cl 10.70; 10.73; N 12.60; 12.58.

$C_{17}H_{14}ClN_3O_3$. Calculated, in percent: C 59.10; H 4.09; N 12.24; Cl 10.35.

EXAMPLE 21

1-(phenoxyacetylcarbaminoyl)benzimidazole was prepared as described in Example 20; the yield of the product was 76 per cent by weight; the melting point, 101°–102°C.

Found, in percent: N 14.56; 14.78; $C_{16}H_{13}N_3O_3$. Calculated, in percent: N 14.25.

EXAMPLE 22

To a suspension of 2 g of methyl ether of 2-amino-1-benzimidazole carboxylic acid in 50 ml of chloroform added at a temperature of 20°C were 4.05 g of 2,4-dichlorophenoxyacetyl chloride; 1.6 g triethylamine was then added dropwise. The reaction mixture was stirred for two hours and then washed two times with 50 ml portions of ice-cold water. The product was separated on a filter, and dried to obtain 3.0 g of 1-(2,4-dichlorophenoxyacetyl)-2-amino-3-carbomethoxybenzimidazoline (75 percent by weight). The chloroform layer was dehydrated over sodium sulphate and the solvent was distilled. The product was purified by washing two times with a mixture of n-heptane and tetrahydrofurane (1:1). The melting point of the product, 169°–170°C.

Found, in percent: N 10.62; 10.54. $C_{17}H_{11}Cl_2N_3O_4$. Calculated, in percent: N 10.68.

EXAMPLE 23

Contact Test for Iradicating Power Against Mildew of Cucumbers.

"Klinskie" variety hothouse-grown cucumbers were used as test plants in the experiment at the stage of seed-lobe development. The preparation was tested on 6–7 plants.

The selected plants were sprinkled with aqueous suspensions of the test preparations (and by the standard solution) in concentrations from 0.02 to 0.005 percent by weight with respect to the active substance. Controls were sprinkled with water. After drying (in about 1.5–2 hours after sprinkling), all plants were infected with an aqueous suspension of the conidia of the pumpkin mildew causative agents. The percentage inhibition of the disease was compared against controls in 10 and 15 days following the infection. The results were estimated by the degree of the mould development on the leaves. The results are tabulated below.

Table 1

| Preparations | Concentration of preparation in % (w/w) with respect to active principle | Percentage inhibition (as compared against controls) | |
|---|---|---|---|
| | | in 10 days after infection | in 15 days after infection |
| 1-Phenoxyacetylcarba- | 0.02 | 100 | 100 |
| | 0.01 | 100 | 94.6 |
| minoyl-2-carbomethoxy aminobenzimidazole | 0.005 | 99.5 | 87.5 |
| 1-γ-(4-methylphenoxy butyrylcarbaminoyl-2-car bometnoxyaminobenzimidazole | 0.02 | 100 | 100 |
| | 0.01 | 100 | 100 |
| | 0.005 | 100 | 97.5 |
| 1-Carbomethoxy-2-(4-nitro- phenoxyacetyl)carbaminoyl- aminobenzimidazole | 0.02 | 100 | 81.7 |
| Benlat | 0.02 | 100 | 100 |
| | 0.01 | 100 | 100 |
| | 0.005 | 99.5 | 95.4 |
| Carathane | 0.02 | 97.1 | 89.6 |
| | 0.01 | 88.2 | 71.4 |
| | 0.05 | 81.7 | 63.2 |
| Controls | | 0 | 0 |
| Disease development in controls | | 87.5 | 87.5 |

EXAMPLE 24

Contact Test for Protective Action Against Mildews of Cucumbers

"Klinskie"-variety hothouse-grown cucumbers at the stage of two full-grown leaves were used in the test, which was carried out on four plants. The rest plants were sprinkled with an aqueous suspension of the test preparation or the known standard preparation (Benlat and Carathane); the controls were sprinkled with water. In four days following the prinkling, all the plants were infected with an aqueous suspension of the conidia of the pumpkin mildew causative agents. The percentage inhibition of the disease development was determined at ten and 18 days following the infection. The results of the test are tabulated below.

Table 2

| Preparations | Concentration of preparation in % (w/w) with respect to active principle | Percentage inhibition (as compared against controls) | |
|---|---|---|---|
| | | in 10 days after infection | in 18 days after infection |
| 1-Phenoxyacetylcarbaminoyl- 2-carbomethoxyaminobenzi- midazole | 0.02 | 94.3 | 69.7 |
| 1-γ-(4-methylphenoxy)- butylcarbaminoyl-2-carbo- methoxyaminobenzimidazole | 0.02 | 100 | 100 |
| | 0.01 | 99.9 | 97.5 |
| | 0.005 | 100 | 92.8 |
| Benlat | 0.02 | 100 | 100 |
| | 0.01 | 100 | 98.9 |
| | 0.005 | 97.6 | 89.7 |
| Carathane | 0.05 | 100 | 98.6 |
| | 0.02 | 97.8 | 94.2 |
| Controls | 0.05 | 100 | 98.6 |
| | 0.02 | 97.8 | 94.2 |
| Disease development in controls | | 85.5% | 87.5% |

EXAMPLE 25

Systemic Eradication of Moldews of Cucumbers

Klinskie variety hothouse-grown cucumbers at the stage of seed-lobe leaves were used in the test, which was carried out on four plants.

The cucumbers intended for the tests had been planted 10 days before the test into two chlorovinyl vessels sizing 10 × 5 cm and holding 450 g of air dried soil. These ten days they had been given water under ordinary prescriptions. On the day of the test they were not watered but 25 ml portions of the aqueous suspension of the test preparation or the standard preparation were introduced into the soil instead in the following concentrations: 0.02 percent by weight, 0.01 percent by weight, 0.005 percent by weight (5, 2.5, and 1.25 mg of the preparation per kg soil). Equal quantities of water were given to the controls. One hour later, the plants were infected by an aqueous suspension of the conidia of the pumpkin mildew causative agents.

The percentage inhibition of the disease was determined against the controls in 10, 15 and 22 days following the infection. The results are given in Table 3.

Table 3

| Preparations | Concentration of preparations in mg per kg soil | Percentage inhibition of disease | | |
|---|---|---|---|---|
| | | in 10 days after infection | in 15 days after infection | in 22 days after infection |
| 1-Phenoxyacetylcarbaminoyl-2-carbomethoxyamino benzimidazole | 5 | 100 | 100 | 100 |
| | 2.5 | 100 | 100 | 100 |
| | 1.25 | 100 | 100 | 100 |
| 1-γ-(4-methylphenoxy) butylcarbaminoyl-2-carbamethoxy aminobenzimidazole | 5 | 100 | 100 | 100 |
| | 2.5 | 100 | 100 | 97.5 |
| | 1.25 | 100 | 96 | 92.8 |
| Benlat | 5 | 100 | 100 | 100 |
| | 2.5 | 100 | 100 | 98.5 |
| | 1.25 | 100 | 100 | 98.5 |
| Control | | 0 | 0 | 0 |
| Disease development in controls | | 71.9 | 87.5 | 87.5 |

EXAMPLE 26

Systemic Action Against Mildews of Cucumbers

Klinskie variety hothouse-grown cucumbers at the stage of two full-grown leaves were used in the test, which was carried out on eight plants.

The plants were grown in chlorovinyl vessels sizing 10 × 5 cm and holding 450 air-dried soil (two plants in each vessel). On the test day, the plants were not watered but 25 ml portion of the aqueous suspension of the test preparation or the standard preparation Benlat (5, 2.5, 1.25 mg per kg soil) were introduced into the soil instead, and water was given to the controls (25 ml). In seven days the plants were infected with the aqueous suspension of the conidia of the pumpkin mildew causative agents. The percentage inhibition of the disease was determined in 10, 15, and 22 days following the day of infection. The results of the test are given below.

Table 4

| Preparations | Concentration of preparation in mg per kg soil | Percentage inhibition of disease (as compared against controls) | | |
|---|---|---|---|---|
| | | in 10 days after infection | in 15 days after infection | in 22 days after infection |
| 1-Phenoxyacetylcarbami noyl-2-carbomethoxyamino benzimidazole | 5 | 100 | 100 | 100 |
| | 2.5 | 100 | 100 | 100 |
| | 1.25 | 100 | 100 | 100 |
| Benlat | 5 | 100 | 100 | 100 |
| | 2.5 | 100 | 100 | 100 |
| | 1.25 | 100 | 100 | 98.5 |
| Controls | — | 0 | 0 | 0 |
| Disease development in controls | | 87.5 | 87.5 | 87.5 |

EXAMPLE 27

Contact Test for Protective Action Against Black Stem Rust

"Krasnozernaia" variety wheat at the stage of one leaf was used in the test. The plants were sprinkled with an aqueous suspension of the test substance. In 24 hours, the plants were infected with uredospores of the causative agent of the disease mixed with talcum in the ratio of 1:20. The mixture was applied onto the wettened leaves in the form of powder. The effectiveness of the preparation was determined in ten days following the infection, after appearance of the disease symptoms in the controls. The results of the test are tabulated below.

Table 5

| Preparation | Concentration of preparation in % (w/w) with respect to active principle | Percentage inhibition of disease as compared against controls |
|---|---|---|
| 1-(2,4-dichlorophenoxyacetyl)--carbaminoyl-2-carbomethoxyaminobenzimidazole | 0.1 | 97.8 |
| | 0.05 | 85.6 |
| 1-(2-methyl-4-chlorophenoxy-acetylcarbaminoyl-2-carbo-methoxyaminobenzimidazole | 0.1 | 94.0 |
| | 0.05 | 87.3 |
| 1-(4-chlorophenoxyacetylcarbaminoyl-2-carbomethoxyaminobenzimidazole | 0.1 | 91.8 |
| | 0.05 | 82.8 |
| 1-[γ-(4-methylphenoxy)-butyryl-carbaminoyl]-2-carbomethoxyamino-benzimidazole | 0.1 | 83.7 |
| 1-phenoxyacetylcarbaminoyl-2-carbomethoxyaminobenzimidazole | 0.1 | 80.5 |
| 2-γ-hydroxypropylbenzimidazole | 0.1 | 99.2 |
| 2-γ-hydroxypropylbenzimidazole acetate | 0.1 | 87.8 |
| | 0.1 | 96.4 |
| Benlat | 0.05 | 79.7 |
| | 0.1 | 97.1 |
| Zineb | 0.05 | 95.1 |
| Controls | — | 0 |
| Disease development in controls | | 38 per cent |

EXAMPLE 28

Eradicating Action Against Black Stem Rust of Wheat

Krasnozernaia variety wheat plants at the stage of one leaf were used in the tests. The plants were infected in 24 hours after they had been sprinkled with the aqueous suspensions of the preparations, by dusting wettened leaves with dry spores mixed with talcum in the ratio of 1:20. After keeping for 24 hours in a wet chamber, the plants were set in a hot-house. The efficacy of the preparation was assessed in ten days. The results are tabulated below.

Table 6

| Preparation | Concentration of preparation in % (w/w) with respect to active principle | Percentage inhibition of disease as compared against controls |
|---|---|---|
| 2-γ-hydroxypropylbenzimidazole | 0.1 | 92.7 |
| 2-γ-hydroxypropylbenzimidazole acetate | 0.1 | 89.7 |
| Zineb | 0.1 | 79.4 |
| Controls | — | 0 |
| Disease development in controls | | 46% |

EXAMPLE 29

Systemic Action Against Black Stem Rust of Wheat

Wheat plants at the phase of one leaf were used in the tests. The preparations were introduced into the soil in the form of aqueous suspensions (40 and 20 mg of the active) principle per kg air-dried soil. Simultaneously, the wettened leaves were dusted with dry spores of the causative agents of stem rust mixed with talcum in the ratio of 1:20. The plants were then kept for 24 hours in a wet chamber and then set in a hot-house. The efficacy of the preparation was assessed in ten days after infection. The results are given in the table below.

Table 7

| Preparation | Concentration of preparation in mg per kg dry soil | Percentage inhibition of disease as compared against controls |
|---|---|---|
| 1-(2,4-dichlorophenoxyacetyl)-carbaminoyl-2-carbomethoxyaminobenzimidazole | 40 | 97.6 |
|  | 20 | 86.0 |
| 1-(2-methyl-4-chlorophenoxyacetylcarbaminoyl-2-carbomethoxyaminobenzimidazole | 40 | — |
|  | 20 | 85.2 |
| 1-(4-chlorophenoxyacetyl)-carbaminoyl-2-carbomethoxyaminobenzimidazole | 40 | 96.0 |
|  | 20 | 94.2 |
| 1-[γ-(4-methylphenoxy)-butyrylcarbaminoyl]-2-carbomethoxyaminobenzimidazole | 40 | 84.5 |
| Benlat | 40 | 97.6 |
|  | 20 | 89.1 |
| Controls | — | 0 |
| Disease development in controls | | 38% |

EXAMPLE 30

Anticeptic Activity Against Moulds Attacking Nonmetallic Materials

The preparations were tested on pure cultures as follows.

The preparation was dissolved in acetone and the solution introduced into a molten must-agar in sterile conditions. The fungicidal activity of the preparation was assessed by the inhibition of mycelium growth in colonies of test cultures on the surface of the agar plate in Petri dishes. The activity of the preparation was determined by the percentage inhibition of growth of mycelium of pure mould cultures. The results of the test are tabulated below.

Table 8

| Preparation | Concentration in % (w/w) | Percentage inhibition of mycelium growth of pure mould culture | | | | |
|---|---|---|---|---|---|---|
| | | P.funicolosum | P.varioti | F.viride | Ch.globosum | A. niger |
| 1.Phenoxyacetylcarbaminoyl-2-carbomethoxyaminobenzimidazole | 0.00005 | 100 | 86 | 94 | 100 | 69 |
| 1-(2-methyl-4-chlorophenoxyacetylcarbaminoyl)-2-carbomethoxyaminobenzimidazole | 0.00005 | 84 | 60 | 90 | 90 | 38 |
| 1(γ-4-methylphenoxybutylcarbaminoyl)-2-carbomethoxyaminobenzimidazole | 0.00005 | 85 | 56 | 87 | 77 | 42 |
| Benlat | 0.00005 | 100 | 89 | 100 | 95 | 79 |
| Pentachlorophenol | 0.00005 | 0 | 0 | 0 | 0 | 0 |
| | 0.0008 | 46 | 64 | 49 | 56 | 56 |

EXAMPLE 31

Anticeptic Activity of 1-Phenoxyacetylcarbaminoyl-2-carbomethoxyaminobenzimidazole as Tested on Natural Leather Specimens The preparation was applied to the skin during oiling. Specimens of dry skin were oiled in laboratory conditions, the oil consumption being 3 percent of dry skin weight. The coiling was carried out at a temperature of 70°–80°C with the oil being preliminarily mixed with the preparation and then rubbed into the skin without residue. The specimens were then air dried.

The processed specimens were tested for resistance to moulds; to this end they were infected with spores of moulds and placed into a dessicator, where they were Table 9

| Preparation | Concentration in %(w/w) with respect to dry skin weight | Assessment of mould growth (affected area in per cent) number of specimens | | | | | | |
|---|---|---|---|---|---|---|---|---|
| | | 1 | 2 | 3 | 4 | 5 | 6 | 7 |
| 1-Phenoxyacetylcarbaminoyl-2-carbomethoxyaminobenzimidazole | 1.5 | 10 | 20 | 20 | 10 | 10 | 10 | 10 |
| | 2.0 | 0 | 0 | 0 | 0 | 0 | 0 | 0 |
| Controls | — | 100 | 100 | 100 | 100 | 100 | 100 | 100 | separated from each other by nontreated skin specimens affected with the mould mycelium on both sides. The specimens were kept in the closed chamber for 30 days at a temperature from 28° to 30°C at a relative air humidity of 90–95 percent.

The results of the test are tabulated below.

EXAMPLE 32.

Anticeptic Activity of Preparations as Tested on Artificial Leather Specimens In order to protect imitation-leather upholstery against moulds, anticeptic preparations were added to the plasticizing agent in the concentration of 0.1; 0.25; 0.5; 1.0 parts per 100 parts by weight of polyvinyl-chloride resin.

The prepared specimens of leather were tested for biological resistance. The specimens were placed onto an agar plate (Čapek-Dox medium) and sprinkled over with a suspension of spores in Čapek-Dox's solution without agar. Then the Petri dishes were placed in a thermostat and kept there at a temperature of 27°–30°C and the relative air humidity of 90–95 percent. The efficacy of the preparation was judged by the degree of development of the mould. The results of the test are given in the table below.

Table 10

| Materil | Preparation | Concentration, weight parts | Assessment of mould growth number of specimens | | | | | |
|---|---|---|---|---|---|---|---|---|
| | | | 1 | 2 | 3 | 4 | 5 | 6 |
| Imitation leather (upholstery) Film | 1-phenoxyacetyl-carbaminoyl-2-carbomethoxyaminobenzimidazole Same | 0.5 | 0 | 0 | 0 | 0 | 0 | 0 |
| | | 1.0 | 0 | 0 | 0 | 0 | 0 | 0 |
| | | 0.5 | 0 | 0 | 0 | 0 | 0 | 0 |
| | | 1.0 | 0 | 0 | 0 | 0 | 0 | 0 |
| Imitation leather Film | Salicylanilide Same | 4.0 | 1 | 2 | 1 | 1 | 1 | 2 |
| | | 4.5 | 0 | 0 | 0 | 0 | 0 | 0 |
| | | 4.0 | 1 | 1 | 1 | 2 | 1 | 1 |
| | | 4.5 | 0 | 0 | 0 | 0 | 0 | 0 |
| Imitation leather Film | Control Control | — | 3 | 4 | 4 | 3 | 4 | 3 |
| | | — | 3 | 3 | 2 | 3 | 2 | 2 |

Notes:
0 — complete inhibition of mould growth;
1 — mould growth can be detected microscopically;
2 — mould growth less than 25 per cent;
3 — mould growth over 25 per cent.

EXAMPLE 33

Fungicidal Activity of Preparations in Tests with Mould Mycelium in vitro

The preparations were tested on mycelium of fungi *Botrytis cinerea*, *Fusarium moniliforme*, *Ventria inaequalis*, *Aspergillus niger*.

The preparations were dissolved in acetone and introduced into molten agar medium at a temperature of 40° to 50 °C. The medium was placed into Petri dishes, 10 millilitres per dish, and in 18–20 hours the agar plate was inoculated. The fungus was introduced with the aid of a needle into three points. After incubation at a temperature of 25°–26°C the diameter of the fungus colony was measured. The inhibition of the fungus growth was calculated with the aid of the Ebbot formula, or $MC_{50}$ (concentration producing 50 percent inhibition of growth) was determined. The results of the tests are given in the tables below.

Table 11

| Chemical compound | $MC_{50}$ with respect to active principle on vegetating mycelium organs | | | |
|---|---|---|---|---|
| | Botrytis cinerea | Fusarium moniliforme | Venturia inaequalies | Aspergillus niger |
| 1(2-methyl-4-chlorophenoxyacetylcarbaminoyl)-2-carbomethoxyaminobenzimidazole | 0.00000025 | 0.00002 | 0.0000015 | 0.0004 |
| 1-γ-(4-methylphenoxy)butyrylcarbamino-2-carbomethoxyaminobenzimidazole | 0.0000013 | 0.00004 | 0.000003 | 0.00004 |
| Phygon | 0.0005 | 0.0009 | 0.0009 | 0.0004 |

Table 12

| Chemical compound | Percentage inhibition of mycelium organ vegetation (0.0003% concentration, with respect to active principle of preparation). | | | |
|---|---|---|---|---|
| | verticilium danliae | Fusarium moniliforme | Venturia inaequalis | Aspergillas niger |
| 1-Phenoxyacetyl-2-carbomethoxyaminobenzimidazole | 100 | 100 | 100 | 100 |
| 1-(2,4-dichlorophenoxyacetyl-2-carbomethoxyaminobenzimidazole | 94.8 | 100 | 100 | 100 |
| 1-(4-nitrophenoxyacetyl)-2-carbomethoxyaminobenzimidazole | 70.6 | 100 | 100 | 100 |
| 1-(4-nitrophenoxyacetyl)2-carbomethoxyamino-4-chlorobenzimidazole | 60.3 | 100 | 93 | 100 |
| 1-(2-methylphenoxyacetyl)-2-carbomethoxyaminobenzimidazole | 100 | 100 | 100 | 100 |
| 1-(4-chlorophenoxyacetyl)-2-carbomethoxyaminobenzimidazole | 87.9 | 100 | 100 | 100 |
| Phygon | 100 | 100 | 72.5 | 100 |

EXAMPLE 34

Systemic Eradicating Action Against Wilt of Cotton

Cotton plants grown in field conditions to three-week age were treated with 50 percent wettable powders of the preparations in the concentrations of 0.001; 0.01 and 0.02 percent with respect to the active substance. The plants were inoculated with the suspension of fungus *Verticillium albo-atrum* and in 1, 3 and 5 days after that were treated with the test preparation. The results of the test show that all preparations inhibit the development of wilt in all cases which indicates that the preparations penetrate the plants and inhibit the development of the disease. In this respect the test preparations were equal to Benlar or somewhat superior to it. The results of the test are tabulated below.

Table 13

| Preparation | Preparation Activity Against Wilt of Cotton | | | |
|---|---|---|---|---|
| | Concentration in % with respect to active principle | Terms of introduction into soil (after inoculation) | | |
| | | in 1 day | in 3 days | in 5 days |
| 2-Phenoxyacetylcarbaminoylaminobenzimidazole | 0.02 | − | − | − |
| | 0.01 | − | − | − |
| | 0.001 | − | − | + |
| 2-(4-nitrophenoxyacetyl carbaminoylamino benzimidazole | 0.02 | − | − | − |
| | 0.01 | − | − | − |
| | 0.001 | − | − | − |
| 1-Carbomethoxy-2-(4-nitrophenoxyacetyl) carbaminoylaminobenzimidazole | 0.02 | − | − | − |
| | 0.01 | − | − | − |
| | 0.001 | − | − | − |
| 1-phenoxyacetylcarbaminoyl-2-carbomethoxyaminobenzimidazole | 0.02 | − | − | − |
| | 0.01 | − | + | + |
| | 0.001 | − | + | + |
| Benlat | 0.02 | − | − | − |
| | 0.01 | − | − | − |
| | 0.001 | − | + | + |
| Controls (watering of roots) | | + | + | + |

Notes:
"+" infection of ten plants;
"−" absent of infection.

The results of the test were assessed in 14 days following the treatment with the preparation.

EXAMPLE 35

Seed Treatment Test

Wheat seeds contaminated with spores of *Tilletia-tritici* (10 g of spores per kg seeds) and treated with the preparations, were tested in laboratory conditions for germination, shooting rate and moulding. The same sporecontaminated seeds pretreated with the preparations were tested in field conditions for their resistance against brand and for the effect of the seed pretreatment on the crops. The results of the tests are given in the table below.

Table 14

| Preparation | Consumption rate in g per kg seed | Laboratory test | | | Field test | yield, in kg per hectare |
|---|---|---|---|---|---|---|
| | | shooting rate, in % | germination; in % | moulding, in % | stinking smut, in % | |
| (50% preparation) 1-phenoxyacetylcarbaminoyl-2-carbomethoxyamino benzimidazole | 2 | 75 | 84 | 0 | 4.06 | 1563 |
| Granozane | 2 | 78 | 78 | 1 | 1.5 | 1234 |
| Hexachlorobenzene (30 per cent) | 2 | 73 | 80 | 10 | 0 | 1320 |
| Controls (non-dressed seeds) | − | 75 | 82 | 15 | 71.7 | 690 |

EXAMPLE 36

Herbicidal Activity Against Dicotyledonous Plants

The herbicidal activity of the preparations and their selectivity were tested by treating the shot plants.

The test plants were grown in chlorovinyl vessels holding 1.5 kg of soil.

During the vegetation period, the plants at the stage of 2–3 leaves were sprinkled with the preparations in doses from 1.25 to 2.5 kg of the active substance per hectare. The herbidical efficacy of the preparation was assessed in 14 days against a six-degree scale, where:

0 designates the absence of affection;
1 — very insignificant affections;
2 — insignificant inhibition of plant growth (10–20 percent perish);
3 — marked inhibition of growth (30–50 percent perish);
4 — strong inhibition of growth (60–80 percent plants perish); and
5 — complete inhibition of growth (90–100 percent plants perish).

The results are tabulated below.

Table 15

| Preparation | Dose in kg/hectare (active principle) | Wheat | Millet | Haricot bean | Radish | Beat | Cotton | Flax | Tomato | Cucumbers |
|---|---|---|---|---|---|---|---|---|---|---|
| 1 | 2 | 3 | 4 | 5 | 6 | 7 | 8 | 9 | 10 | 11 |
| 1-(2,4-dichlorophenoxyacetyl)carbaminoyl-2-carbomethoxyaminobenzimidazole | 1.25 | 0 | 0 | 3 | 3 | 2 | 1 | 4 | 3 | 3 |
|  | 2.5 | 0 | 0 | 4 | 5 | 3 | 2 | 5 | 4 | 5 |
| 1-(2-methyl-4-chlorophenoxyacetylcarbaminoyl-2-carbomethoxyaminobenzimidazole | 1.25 | 0 | 0 | 2 | 3 | 2 | 1 | 4 | 3 | 3 |
|  | 2.5 | 0 | 0 | 3 | 4 | 3 | 2 | 5 | 3 | 5 |
| 1-(4-chlorophenoxyacetyl)-carbaminoyl-2-carbomethoxyaminobenzimidazole | 1.25 | 0 | 0 | 3 | 4 | 3 | 1 | 4 | 3 | 3 |
|  | 2.5 | 0 | 0 | 4 | 4 | 4 | 2 | 5 | 3 | 4 |
| Amine salt 2,4-D | 0.8 | 0 | 0 | 4 | 4 | 4 | 2 | 5 | 3 | 4 |
|  | 1.25 | 0 | 0 | 4 | 5 | 4 | 3 | 5 | 4 | 4 |

What we claim is:

1. 1-(Phenoxyacetyl)carbaminoyl-2-carbomethoxyaminobenzimidazole having the formula:

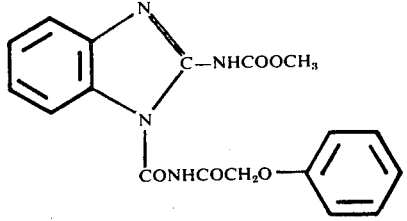

* * * * *